(12) United States Patent
Matsunaga et al.

(10) Patent No.: US 11,372,808 B2
(45) Date of Patent: Jun. 28, 2022

(54) DATA RECORDING TRANSMISSION DEVICE, DATA RECORDING TRANSMISSION METHOD, AND DATA RECORDING TRANSMISSION PROGRAM

(71) Applicant: JVCKENWOOD Corporation, Yokohama (JP)

(72) Inventors: Yoshihiro Matsunaga, Yokohama (JP); Toshiaki Hojo, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 425 days.

(21) Appl. No.: 16/516,665

(22) Filed: Jul. 19, 2019

(65) Prior Publication Data

US 2020/0050584 A1 Feb. 13, 2020

(30) Foreign Application Priority Data

Aug. 20, 2018 (JP) .............................. JP2018-149060

(51) Int. Cl.
*G06F 16/11* (2019.01)
*G06F 3/06* (2006.01)

(52) U.S. Cl.
CPC .......... *G06F 16/122* (2019.01); *G06F 3/0604* (2013.01); *G06F 3/067* (2013.01); *G06F 3/0647* (2013.01)

(58) Field of Classification Search
CPC .... G06F 16/122; G06F 3/0604; G06F 3/0647; G06F 3/067
See application file for complete search history.

(56) References Cited

U.S. PATENT DOCUMENTS

| 6,125,397 A * | 9/2000 | Yoshimura ............... H04L 47/10 370/229 |
| 6,476,935 B1 * | 11/2002 | Fujino ................. H04N 1/32037 358/400 |
| 6,553,476 B1 * | 4/2003 | Ayaki ..................... H04N 5/781 711/204 |

(Continued)

FOREIGN PATENT DOCUMENTS

JP 2018-006957 A 1/2018

*Primary Examiner* — Debbie M Le
*Assistant Examiner* — Huen Wong
(74) *Attorney, Agent, or Firm* — Nath, Goldberg & Meyer; Jerald L. Meyer

(57) ABSTRACT

A controller records management information of a file for transmission including unit data on a management table when a recording medium I/F records the unit data in a recording medium. The controller transmits the file for transmission to an external device by a network I/F. The controller erases the management information of the file for transmission after transmitting the file for transmission, and records the management information of the file for recording including the unit data on the management table. The controller updates the management information of the file for recording to management information obtained by combining new unit data with the unit data included in advance whenever the recording medium I/F records the new unit data in the recording medium, records the management information of the file for transmission on the management table, and erases the management information of the file for transmission after transmitting the file for transmission.

3 Claims, 12 Drawing Sheets

(56) References Cited

U.S. PATENT DOCUMENTS

| | | | | |
|---|---|---|---|---|
| 7,581,077 | B2* | 8/2009 | Ignatius | G06F 3/0613 |
| | | | | 711/154 |
| 2003/0061490 | A1* | 3/2003 | Abajian | G06F 16/48 |
| | | | | 713/176 |
| 2003/0131068 | A1* | 7/2003 | Hoshino | G06F 3/0689 |
| | | | | 709/216 |
| 2004/0153323 | A1* | 8/2004 | Charney | G06F 3/16 |
| | | | | 704/270.1 |
| 2004/0267834 | A1* | 12/2004 | Sasaki | G06F 16/273 |
| 2006/0233535 | A1* | 10/2006 | Honda | H04N 5/765 |
| | | | | 386/248 |
| 2010/0161685 | A1* | 6/2010 | Jain | G06F 3/0641 |
| | | | | 707/812 |
| 2010/0250880 | A1* | 9/2010 | Mimatsu | G06F 3/0608 |
| | | | | 711/162 |
| 2013/0219069 | A1* | 8/2013 | Yellapragada | G06F 3/0664 |
| | | | | 709/226 |
| 2017/0200007 | A1* | 7/2017 | Drummond | H04W 12/041 |
| 2017/0200008 | A1* | 7/2017 | Wright | H04L 63/0428 |
| 2018/0060162 | A1* | 3/2018 | Qiang | G06F 11/2064 |
| 2020/0050584 | A1* | 2/2020 | Matsunaga | G06F 3/0604 |

\* cited by examiner

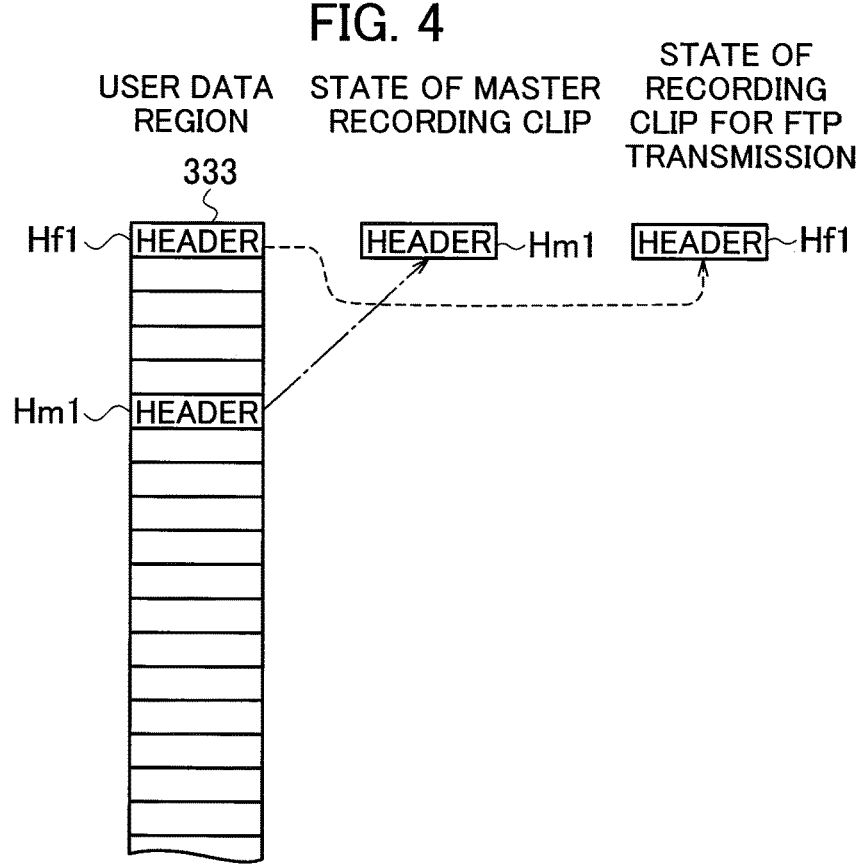
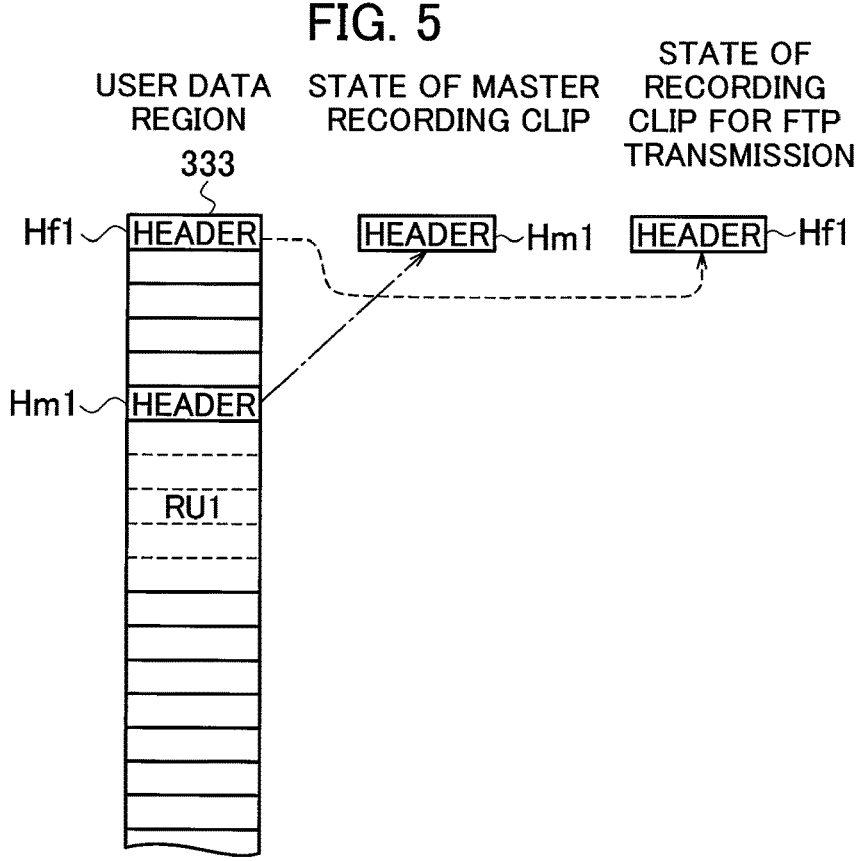

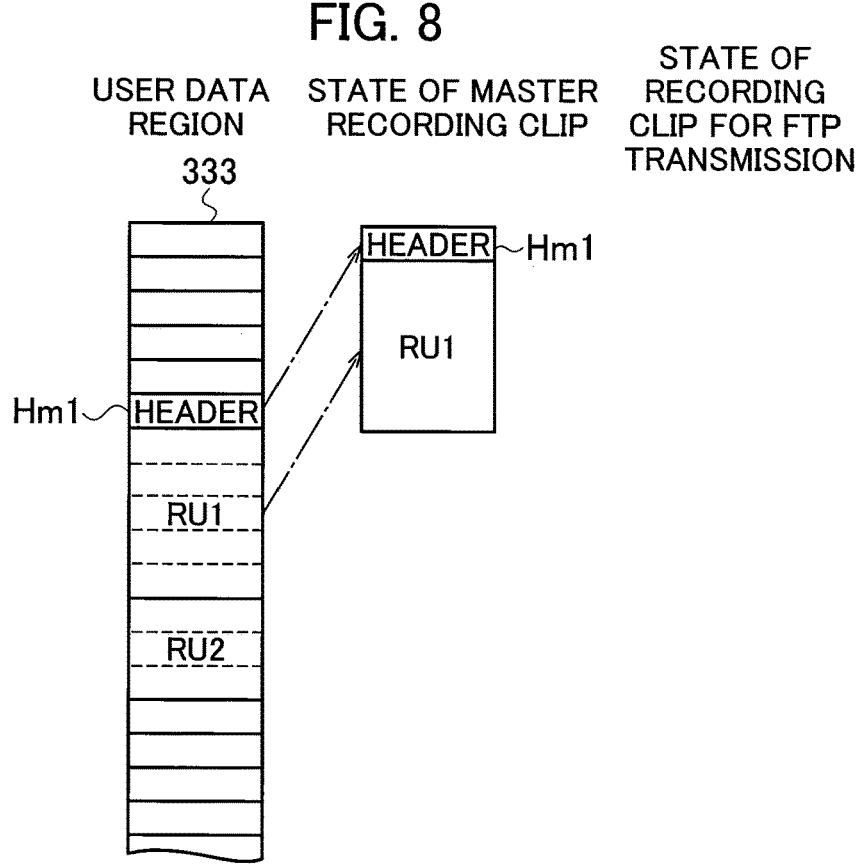
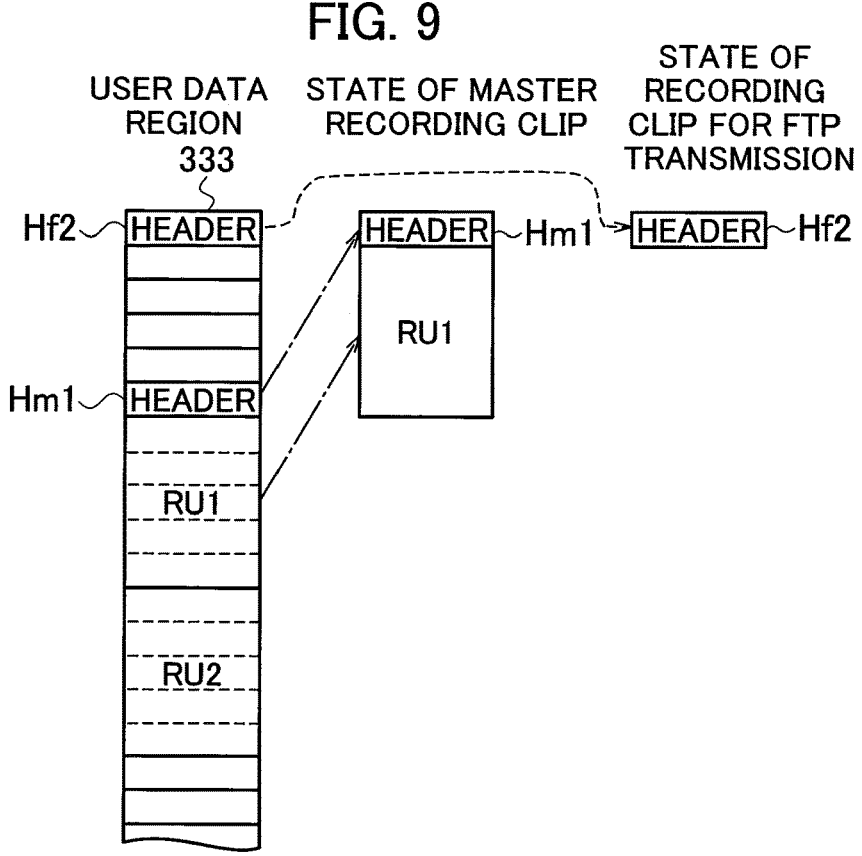

DATA RECORDING TRANSMISSION DEVICE, DATA RECORDING TRANSMISSION METHOD, AND DATA RECORDING TRANSMISSION PROGRAM

CROSS REFERENCE TO RELATED APPLICATION

This application is based upon and claims the benefit of priority under 35 U.S.C. § 119 from Japanese Patent Application No. 2018-149060 filed on Aug. 8, 2018, the entire contents of which are incorporated herein by reference.

BACKGROUND

The present disclosure relates to a data recording transmission device, a data recording transmission method, and a data recording transmission program.

Video cameras having a function of recording video data and transmitting the recorded video data to an external device through a network (network transmission) have become widespread (refer to Japanese Unexamined Patent Application Publication No. 2018-6957).

SUMMARY

Typically, a data recording transmission device mounted on a conventional video camera transmits video data in response to a user's operation after capturing is terminated. When video recording time through one capturing becomes longer, immediacy of network transmission decreases. In order to improve immediacy of network transmission, it is necessary to stop capturing and terminate one capturing in a short period of time.

When video recording time through one capturing becomes longer, the capacity of video data to be transmitted increases, and thus time for which the network transmission of the video data is performed becomes longer. The network transmission of large data may increase the load applied to a network, which is an undesirable result.

A first aspect of one or more embodiments provides a data recording transmission device including: a recording medium interface configured to record data in a recording medium; a network interface configured to transmit the data recorded in the recording medium to an external device through a network; and a controller configured to control the recording of the data in the recording medium and the transmission of the data recorded in the recording medium to the external device through the network, wherein the controller records management information of a file for transmission including unit data on a management table recorded in the recording medium when the recording medium interface records data which is a predetermined time or a predetermined size as the unit data in the recording medium, transmits the file for transmission to the external device through the network by the network interface, erases the management information of the file for transmission on the management table after transmitting the file for transmission and records management information of a file for recording including the unit data on the management table, and updates the management information of the file for recording to management information obtained by combining new unit data with the unit data included in advance whenever the recording medium interface records the new unit data in the recording medium, records the management information of the file for transmission on the management table, and erases the management information of the file for transmission after transmitting the file for transmission.

A second aspect of one or more embodiments provides a data recording transmission method including: causing a controller that controls the recording of the data in the recording medium and the transmission of the data recorded in the recording medium to the external device through the network to: record management information of a file for transmission including unit data on a management table recorded in the recording medium when the recording medium interface records data which is a predetermined time or a predetermined size as the unit data in the recording medium; transmit the file for transmission to the external device through the network by the network interface; erase the management information of the file for transmission on the management table after transmitting the file for transmission and record management information of a file for recording including the unit data on the management table; and update the management information of the file for recording to management information obtained by combining new unit data with the unit data included in advance whenever the recording medium interface records the new unit data in the recording medium, record the management information of the file for transmission on the management table, and erase the management information of the file for transmission after transmitting the file for transmission.

A third aspect of one or more embodiments provides a computer software product that includes a non-transitory storage medium readable by a processor, the non-transitory storage medium having stored thereon a set of instructions for performing recording and transmission of data, the instructions including: a first set of instructions of recording management information of a file for transmission including unit data on a management table recorded in the recording medium when the recording medium interface records data which is a predetermined time or a predetermined size as the unit data in the recording medium; a second set of instructions of transmitting the file for transmission to the external device through the network by the network interface; a third set of instructions of erasing the management information of the file for transmission on the management table after transmitting the file for transmission and recording management information of a file for recording including the unit data on the management table; and a fourth set of instructions of updating the management information of the file for recording to management information obtained by combining new unit data with the unit data included in advance whenever the recording medium interface records the new unit data in the recording medium, recording the management information of the file for transmission on the management table, and erasing the management information of the file for transmission after transmitting the file for transmission.

BRIEF DESCRIPTION OF THE DRAWINGS

FIG. 4 is a diagram illustrating a state where a header for a master recording clip and a header for a recording clip for FTP transmission are recorded in the user data region immediately after a file is opened.

FIG. 5 is subsequent to FIG. 4 and is a diagram illustrating a state where a recording unit RU1 for multiplexed data is recorded in the user data region.

FIG. 8 is subsequent to FIG. 7 and is a diagram illustrating a state where the transmission of the recording clip for FTP transmission including the recording unit RU1 is completed and management information of the master recording clip is recorded on the file allocation table.

FIG. 9 is subsequent to FIG. 8 and is a diagram illustrating a state where the recording of the recording unit RU2 is completed and the header for the recording clip for FTP transmission including the recording unit RU2 is recorded in the user data region.

DETAILED DESCRIPTION

Figure 1:
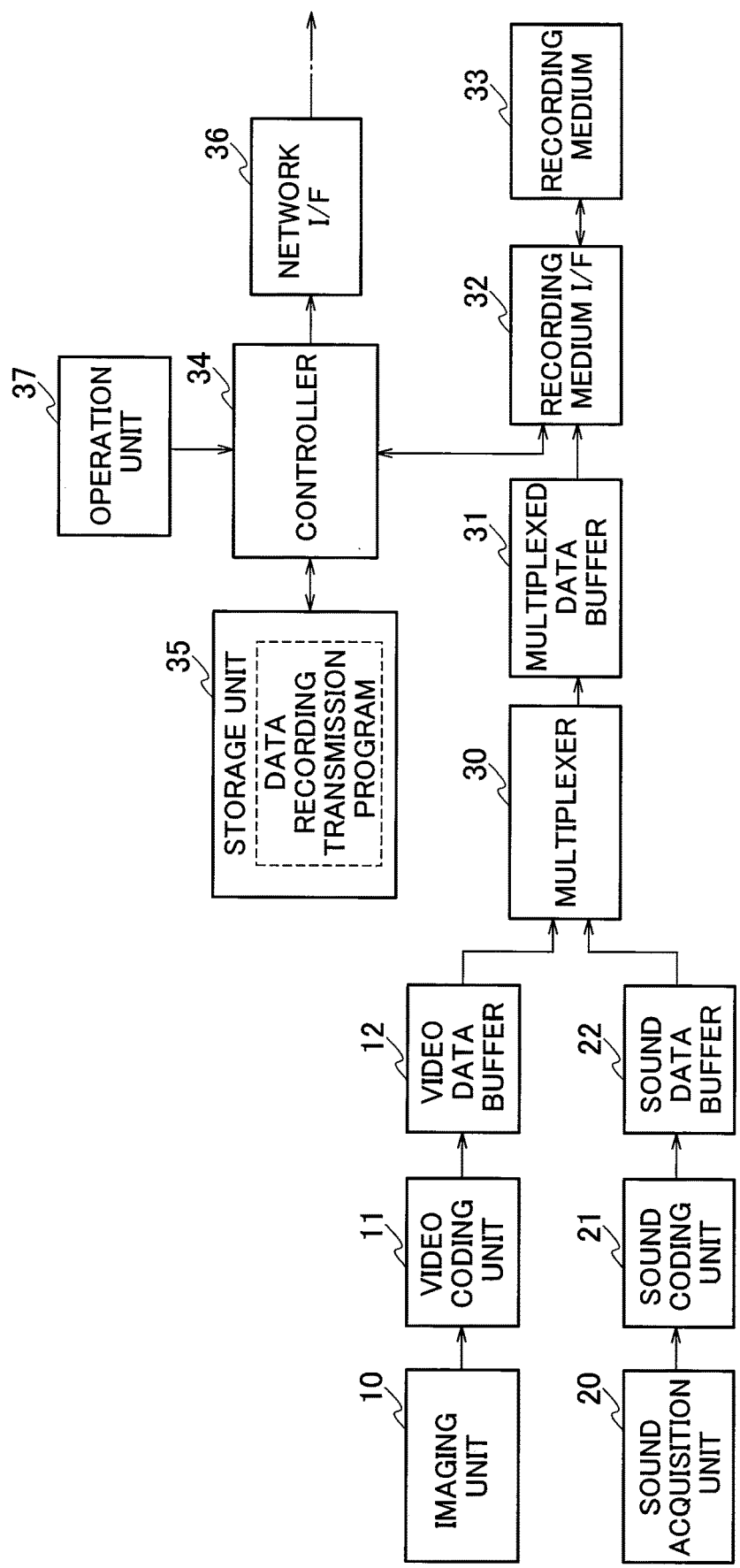
FIG. 1 is a block diagram illustrating a configuration example of a video camera on which a data recording transmission device according to one or more embodiments is mounted.

Hereinafter, a data recording transmission device, a data recording transmission method, and a data recording transmission program according to one or more embodiments will be described with reference to the accompanying drawings. FIG. 1 illustrates a configuration example of a video camera on which the data recording transmission device according to one or more embodiments is mounted and which executes the data recording transmission method according to one or more embodiments. A controller 34 (a central processing unit of a computer) included in the video camera illustrated in FIG. 1 executes the data recording transmission program according to one or more embodiments.

In FIG. 1, an imaging unit 10 captures a subject and supplies a video signal to a video coding unit 11. The imaging unit 10 includes a plurality of lenses and an imaging element which is a charge coupled device (CCD) or a complementary metal-oxide-semiconductor (CMOS). When the imaging unit 10 outputs a video signal which is a digital signal, the imaging unit supplies the video signal which is a digital signal to a video coding unit 11 as it is. When the imaging unit 10 outputs a video signal which is an analog signal, the imaging unit may convert the video signal into a digital signal using an unillustrated A/D converter and supply the converted signal to the video coding unit 11.

The video coding unit 11 performs compression coding of the video signal in a predetermined format, and a video data buffer 12 temporarily accumulates the coded video data.

A sound acquisition unit 20 including a microphone acquires sound and supplies a sound signal to a sound coding unit 21. The sound signal is converted into a digital signal using an unillustrated A/D converter and supplied to the sound coding unit 21. The sound coding unit 21 performs compression coding of a sound signal in a predetermined format, and a sound data buffer 22 temporarily accumulates the coded sound data.

A multiplexer 30 multiplexes video data which is output from the video data buffer 12 and sound data which is output from the sound data buffer 22 to generate multiplexed data. The multiplexed data may be any format. A multiplexed data buffer 31 temporarily accumulates the multiplexed data.

A controller 34 executes a data recording transmission program stored in a storage unit 35 to control recording or reproduction of the multiplexed data in or from a recording medium 33, and network transmission of the multiplexed data to an external device through a network.

A recording medium interface (recording medium I/F) 32 records the multiplexed data in the recording medium 33 and reads the multiplexed data recorded in the recording medium 33 under control of the controller 34. A network interface (network I/F) 36 performs network transmission of the multiplexed data under control of the controller 34. The network I/F 36 transmits the multiplexed data through a wired LAN or a wireless LAN. The network I/F 36 transmits the multiplexed data based on a Wi-Fi standard, for example.

An operation unit 37 is connected to the controller 34. A user of the video camera operates the operation unit 37 to start or end capturing and recording of multiplexed data using the video camera. The user can operate the operation unit 37 to set conditions when the network I/F 36 transmits multiplexed data.

When configuring the video camera illustrated in FIG. 1, choice of hardware and software is arbitrary. The video coding unit 11 and the sound coding unit 21 may be respectively constituted by a video coding circuit and a sound coding circuit, or may be constituted by software. The video coding unit 11 and the sound coding unit 21 may be integrated with each other.

The video data buffer 12, the sound data buffer 22, and the multiplexed data buffer 31 may be constituted by a storage unit such as a RAM, or may be constituted by software. The multiplexer 30 may be constituted by a multiplexing circuit or may be constituted by software.

The recording medium 33 is a memory card as an example. A recording medium I/F 32 is constituted by hardware and software. The controller 34 can be constituted by a central processing unit (CPU). The storage unit 35 can be constituted by a ROM or a RAM which is a non-transitory storage medium. The network I/F 36 is constituted by hardware and software.

The controller 34 may control the imaging unit 10 and may control the video coding unit 11 and the sound coding unit 21 in addition to controlling the recording and reproducing of multiplexed data and network transmission. In FIG. 1, a configuration in which multiplexed data obtained by multiplexing video data and sound data is recorded in the recording medium 33 and is transmitted through a network is adopted, but data to be recorded and transmitted is not limited to multiplexed data.

Only video data may be recorded and transmitted, or only sound data may be recorded and transmitted. Data other than video data and sound data may be recorded and transmitted. Data to be recorded and transmitted may be any data.

Figure 2:
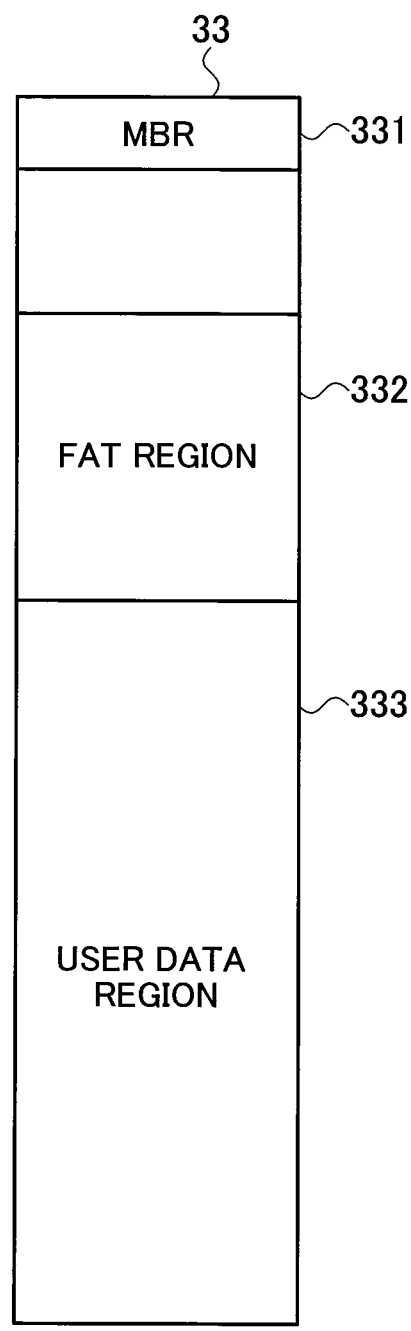
FIG. 2 is a diagram illustrating an example of a logical structure of a recording medium.

Reference will be made to FIGS. 2 to 15 to describe how multiplexed data is recorded in the recording medium 33 and transmitted through a network. FIG. 2 illustrates an example of a logical structure of the recording medium 33. The recording medium 33 is divided into a plurality of sectors, and the first sector is a master boot record (MBR) 331. A file allocation table (FAT) region 332 is provided with a plurality of sectors, and a user data region 333 is provided with a plurality of sectors.

For example, a file allocation table based on FAT32 is recorded in the FAT region 332. The file allocation table is a management table for managing data recorded in the user data region 333. Multiplexed data which is an example of user data is recorded in the user data region 333.

Figure 3:
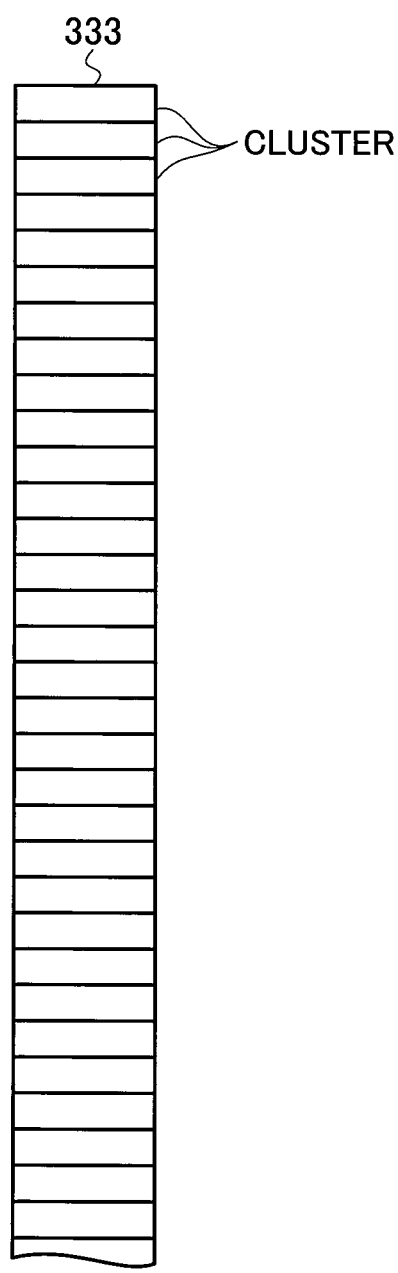
FIG. 3 is a diagram conceptually illustrating a user data region of the recording medium.

As illustrated in FIG. 3, the user data region 333 is divided into a plurality of clusters, and data is recorded in the user data region 333 in units of clusters. The file allocation table manages data recorded in the user data region 333 in units of clusters.

When the controller 34 opens a file to record multiplexed data in the recording medium 33, the controller 34 records a header Hm1 for a master recording clip (a file for recording) in a predetermined cluster of the user data region 333 and records a header Hf1 for a recording clip for FTP transmission (a file for transmission) in another predetermined cluster as illustrated in FIG. 4. The positions of the clusters in which the headers Hm1 and Hf1 are recorded are arbitrary. The header Hf1 and headers Hf2 and Hf3 to be described later are first headers, and the header Hm1 is a second header.

Here, the master recording clip (the recording clip for FTP transmission) is a video file in any format such as AVI, MP4, or MOV. In one or more embodiments, the master recording clip is configured to have a file structure including headers, data, and footers which is a typical structure of a video file. The master recording clip may have a file structure with no header or footer.

In FIGS. 4 to 15, management information of the master recording clip on the file allocation table and management information of the recording clip for FTP transmission are conceptually illustrated at each timing on the right side of the user data region 333. The management information of the master recording clip indicates the state of the master recording clip managed in the file allocation table, and the management information of the recording clip for FTP transmission indicates the state of the recording clip for FTP transmission managed in the file allocation table.

The master recording clip is a clip for recording multiplexed data in the recording medium 33 as a file, and the recording clip for FTP transmission is a clip for recording multiplexed data to be transmitted through a network. In one or more embodiments, the network I/F 36 transmits multiplexed data through a network based on a file transfer protocol (FTP). Hereinafter, network transmission will be referred to as FTP transmission.

As illustrated in FIG. 5, the controller 34 records a recording unit RU1 for multiplexed data from a cluster continuous with the header Hm1 for the master recording clip sequentially in units of clusters. The position of a cluster in which the recording unit RU1 recorded is an example. The recording unit RU1 and recording units after a recording unit RU2 to be described later are collectively referred to as a recording unit RU. The recording unit RU is multiplexed data of which recording time is in units of 10 seconds, for example.

The recording unit RU may be multiplexed data in units of predetermined fixed sizes with variable recording times, or may be multiplexed data in units of fixed recording times and fixed sizes. In the latter case, a maximum size assumed from a bit rate may be set to be a fixed size.

The recording unit RU is unit data when the network I/F 36 for performing FTP transmission of multiplexed data. As described above, a predetermined time which is for example 10 seconds or a predetermined size may be set to be unit data. Time or size which is unit data is set in advance by a user operating the operation unit 37.

Figure 6:
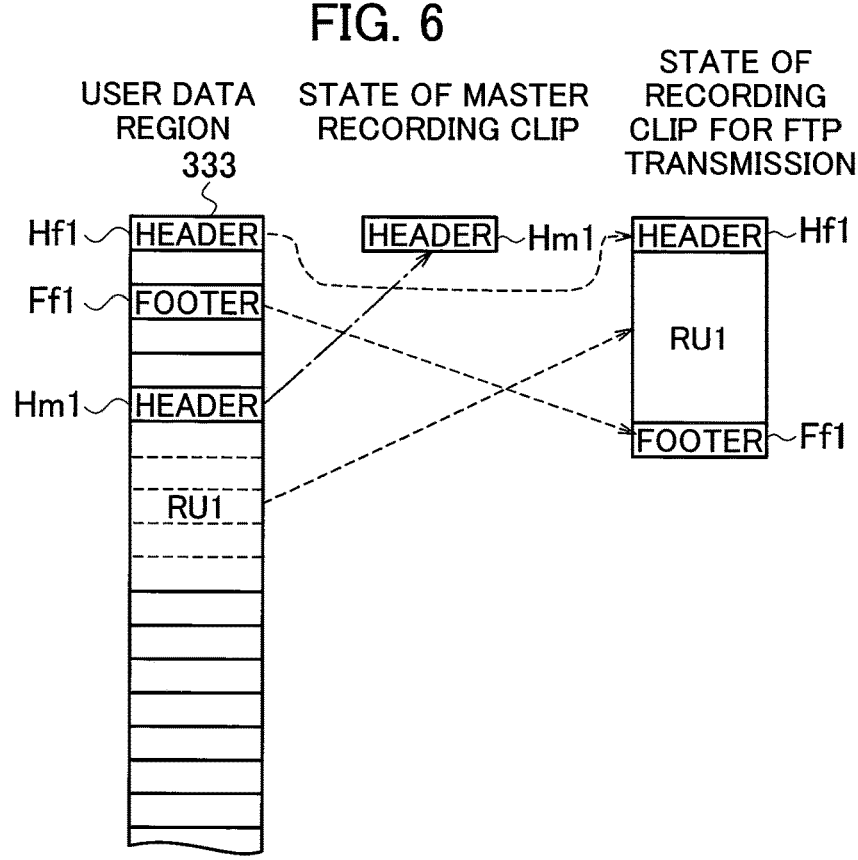
FIG. 6 is subsequent to FIG. 5 and is a diagram illustrating a state where a footer for the recording clip for FTP transmission including a recording unit RU1 is recorded in the user data region and management information of the recording clip for FTP transmission including the recording unit RU1 is recorded on a file allocation table.

As illustrated in FIG. 6, when the recording medium I/F 32 completes the recording of the recording unit RU1, the controller 34 records a footer Ff1 for a recording clip for FTP transmission in a predetermined cluster of the user data region 333. The footer Ff1 and footers Ff2 and Ff3 to be described later are first footers.

In addition, the controller 34 records management information of the recording clip for FTP transmission including the recording unit RU1 on the file allocation table. The management information of the recording clip for FTP transmission associates the recording unit RU1 with the header Hf1 and the footer Ff1. The recording unit RU1 is associated with the header Hf1 and the footer Ff1, so that the file of the recording clip for FTP transmission including the recording unit RU1 is closed.

Figure 7:
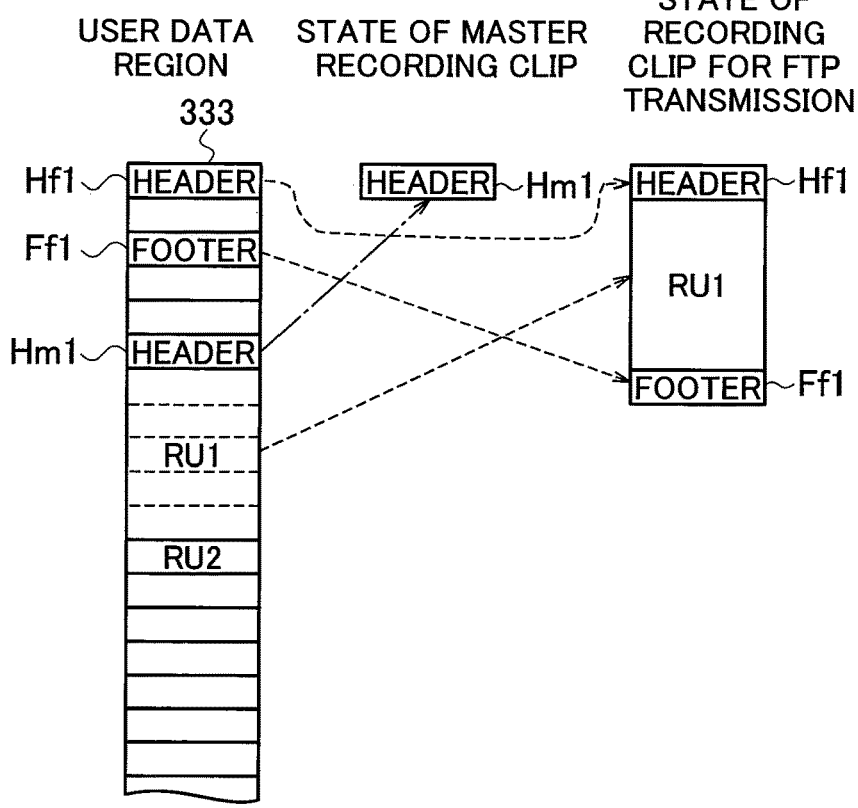
FIG. 7 is subsequent to FIG. 6 and is a diagram illustrating a state immediately after the transmission of the recording clip including the recording unit RU1 for FTP transmission is started and the recording of a recording unit RU2 for multiplexed data is started.

The network I/F 36 starts FTP transmission of the recording clip for FTP transmission including the recording unit RU1 under control of the controller 34. As illustrated in FIG. 7, the controller 34 records the recording unit RU2 for multiplexed data from a cluster continuous with the recording unit RU1 sequentially in units of clusters during FTP transmission. FIG. 7 illustrates a state where a portion of the recording unit RU2 is recorded in one cluster. The position of a cluster in which the recording unit RU2 is recorded is an example.

As illustrated in FIG. 8, when the network I/F 36 completes FTP transmission of the recording clip for FTP transmission including the recording unit RU1, the controller 34 erases the header Hf1 and the footer Ff1 recorded in the user data region 333 to erase the management information of the recording clip for FTP transmission including the recording unit RU1. The recording unit RU1 recorded in the user data region 333 is maintained as it is.

Moreover, the controller 34 records the management information of the master recording clip including the recording unit RU1 on the file allocation table. The management information of the master recording clip associates the recording unit RU1 and the header Hm1 with each other. In FIG. 8, a portion of the recording unit RU2 is recorded in three clusters.

Figure 10:
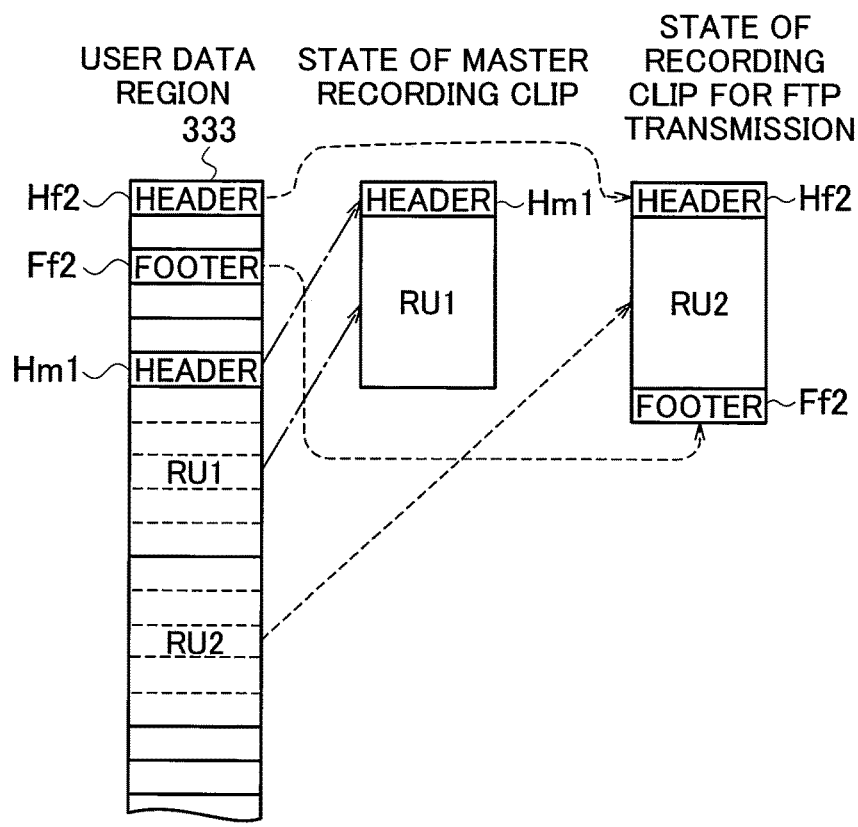
FIG. 10 is subsequent to FIG. 9 and is a diagram illustrating a state where the footer for the recording clip for FTP transmission including the recording unit RU2 is recorded in the user data region and management information of the recording clip for FTP transmission including the recording unit RU2 is recorded on the file allocation table.

As illustrated in FIG. 9, when the recording medium I/F 32 completes the recording of the recording unit RU2 for 10 seconds, the controller 34 records the header Hf2 for the recording clip for FTP transmission in a predetermined cluster of the user data region 333. Subsequently, as illustrated in FIG. 10, the controller 34 records the footer Ff2 for a recording clip for FTP transmission in a predetermined cluster of the user data region 333.

In addition, the controller 34 records management information of the recording clip for FTP transmission including the recording unit RU2 on the file allocation table. The management information of the recording clip for FTP transmission associates the recording unit RU2 with the header Hf2 and the footer Ff2. The recording unit RU2 is associated with the header Hf2 and the footer Ff2, so that the file of the recording clip for FTP transmission including the recording unit RU2 is closed.

Figure 11:
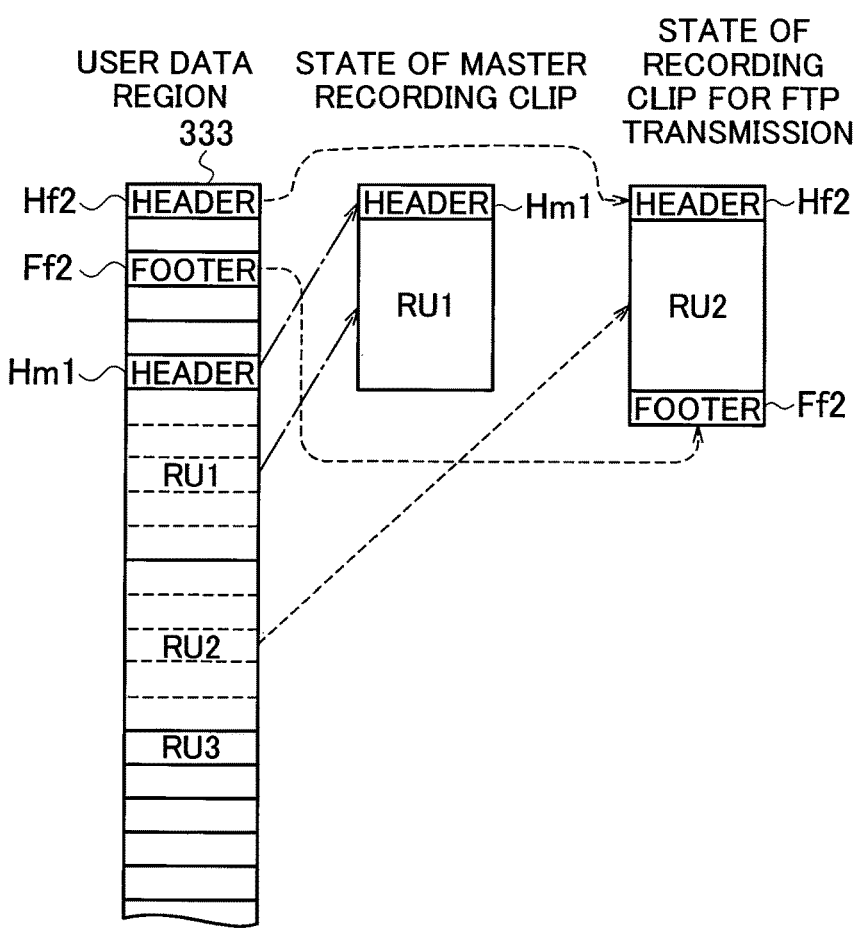
FIG. 11 is subsequent to FIG. 10 and is a diagram illustrating a state immediately after the transmission of the recording clip including the recording unit RU2 for FTP transmission is started and recording of a recording unit RU3 for multiplexed data is started.

Similarly, the network I/F 36 starts FTP transmission of the recording clip for FTP transmission including the recording unit RU2 under control of the controller 34. As illustrated in FIG. 11, the controller 34 records a recording unit RU3 for multiplexed data from a cluster continuous with the recording unit RU2 sequentially in units of clusters during the FTP transmission. FIG. 11 illustrates a state where a portion of the recording unit RU3 is recorded in one cluster. The position of the cluster in which the recording unit RU3 is recorded is an example.

Figure 12:
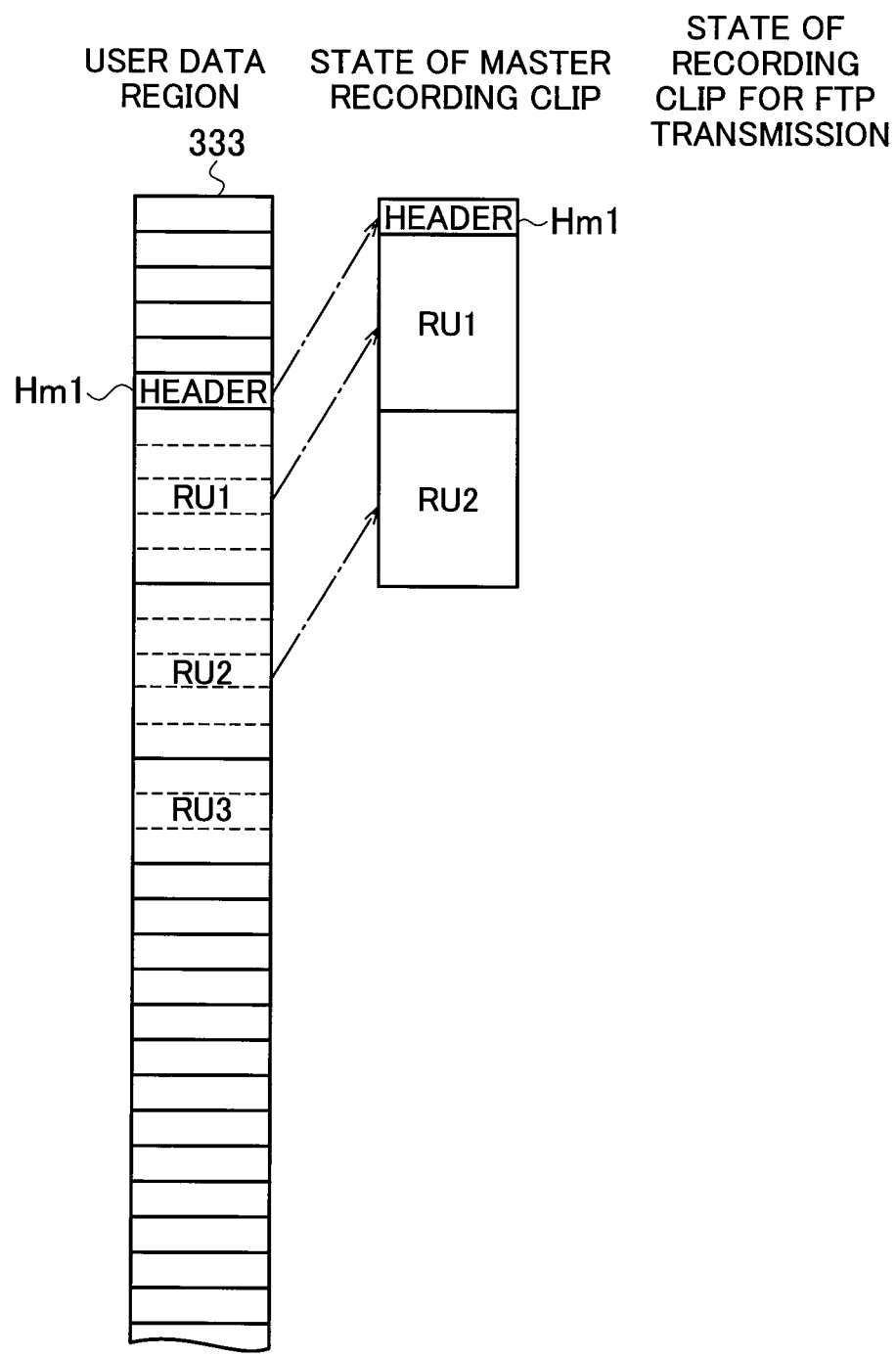
FIG. 12 is subsequent to FIG. 11 and is a diagram illustrating a state where the transmission of the recording clip including the recording unit RU2 for FTP transmission is completed and management information of a master recording clip in which the recording unit RU2 is combined with the recording unit RU1 is recorded on the file allocation table.

As illustrated in FIG. 12, when the network I/F 36 completes FTP transmission of the recording clip for FTP transmission including the recording unit RU2, the controller 34 erases the header Hf2 and the footer Ff2 recorded in the user data region 333 to erase the management information of the recording clip for FTP transmission including the recording unit RU2. The recording unit RU2 recorded in the user data region 333 is maintained as it is.

When the controller 34 erases the management information of the recording clip for FTP transmission including the recording unit RU2, the management information of the master recording clip on the file allocation table is updated to management information obtained by merging (combining) the recording unit RU2 with the recording unit RU1 included in advance. In FIG. 12, a portion of the recording unit RU3 is recorded in three clusters.

In this manner, when the recording medium I/F 32 records a new recording unit RU in the user data region 333 and records management information of the recording clip for FTP transmission on the file allocation table, the controller 34 transmits the recording clip for FTP transmission and then erases the management information. The controller 34 updates the management information of the master recording clip to management information obtained by merging a new recording unit RU to a recording unit RU included in advance whenever the management information of the recording clip for FTP transmission is erased.

Figure 13:
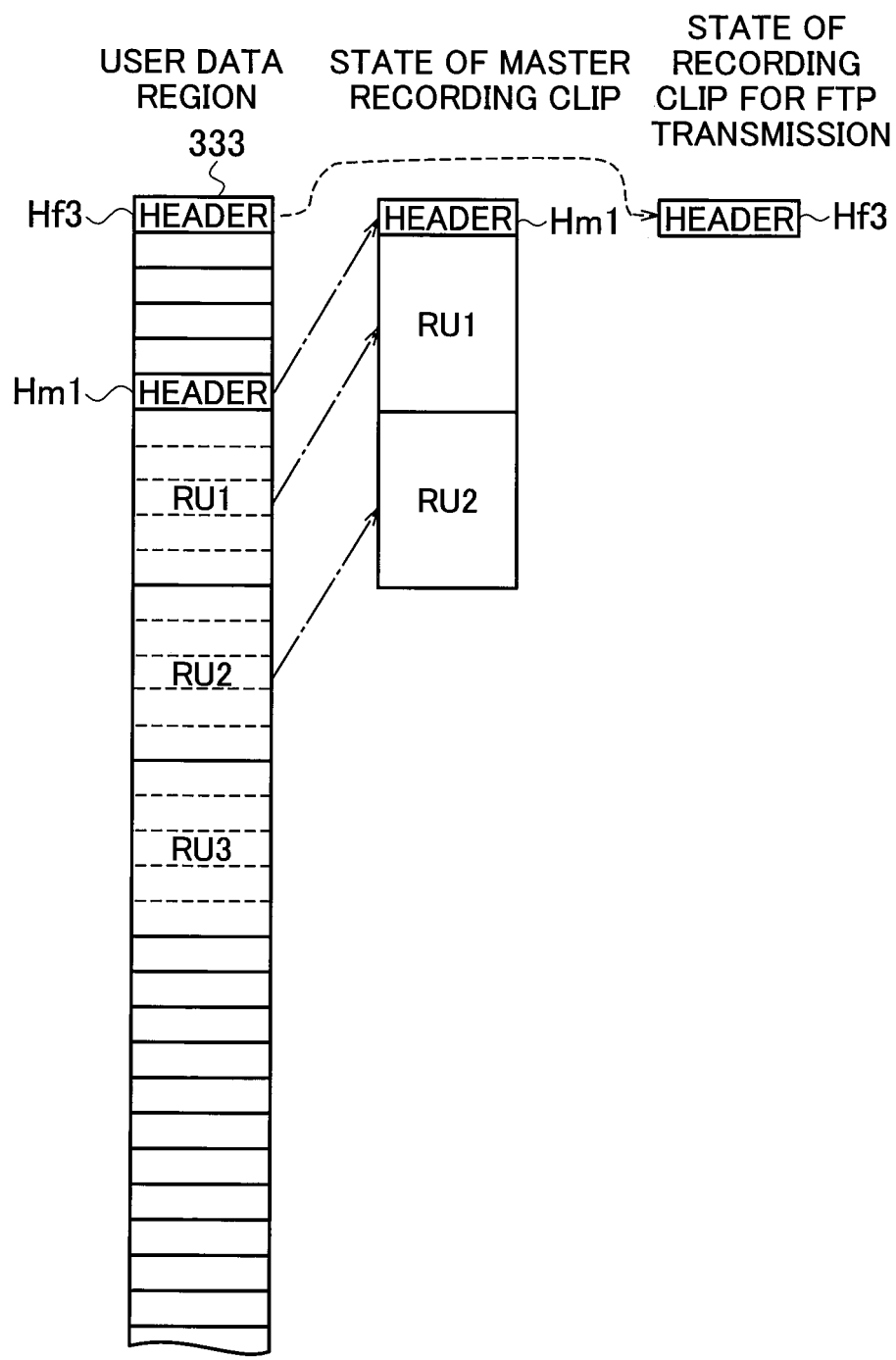
FIG. 13 is subsequent to FIG. 12 and is a diagram illustrating a state where the recording of the recording unit RU3 is completed and a header for the recording clip including the recording unit RU3 for FTP transmission is recorded in the user data region.
Figure 14:
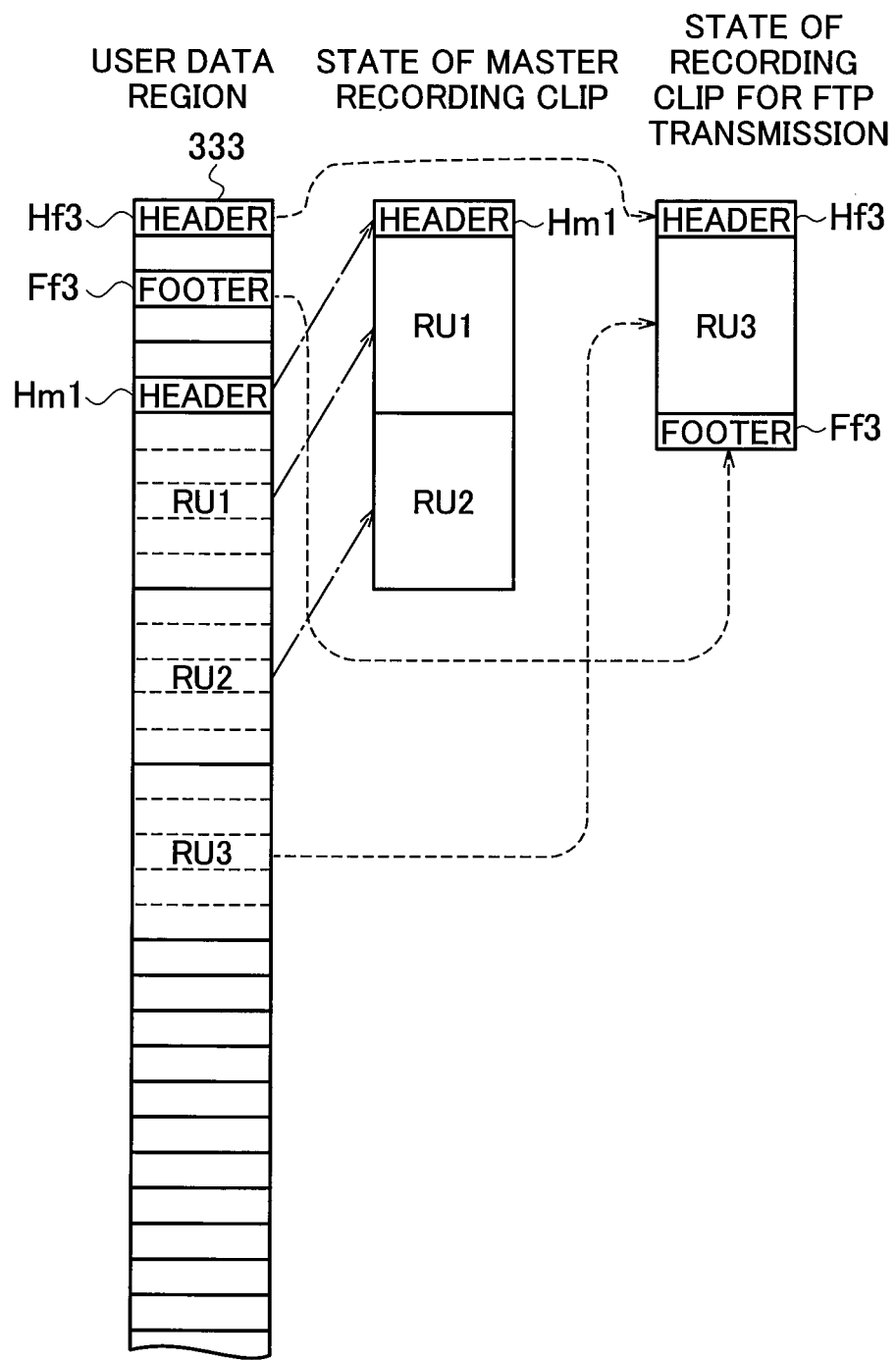
FIG. 14 is subsequent to FIG. 13 and is a diagram illustrating a state where a footer for the recording clip including the recording unit RU3 for FTP transmission is recorded in the user data region and management information of the recording clip including the recording unit RU3 for FTP transmission is recorded on the file allocation table.

As illustrated in FIG. 13, when the recording medium I/F 32 completes the recording of the recording unit RU3 for 10 seconds, the controller 34 records the header Hf3 for a recording clip for FTP transmission in a predetermined cluster of the user data region 333. Subsequently, as illustrated in FIG. 14, the controller 34 records the footer Ff3 for a recording clip for FTP transmission in a predetermined cluster of the user data region 333.

In addition, the controller 34 records management information of the recording clip for FTP transmission including the recording unit RU3 on the file allocation table. The management information of the recording clip for FTP transmission associates the recording unit RU3 with the header Hf3 and the footer Ff3. The recording unit RU3 is associated with the header Hf3 and the footer Ff3, so that the file of the recording clip for FTP transmission including the recording unit RU3 is closed.

The network I/F 36 performs FTP transmission of the recording clip for FTP transmission including the recording unit RU3 under control of the controller 34.

Figure 15:
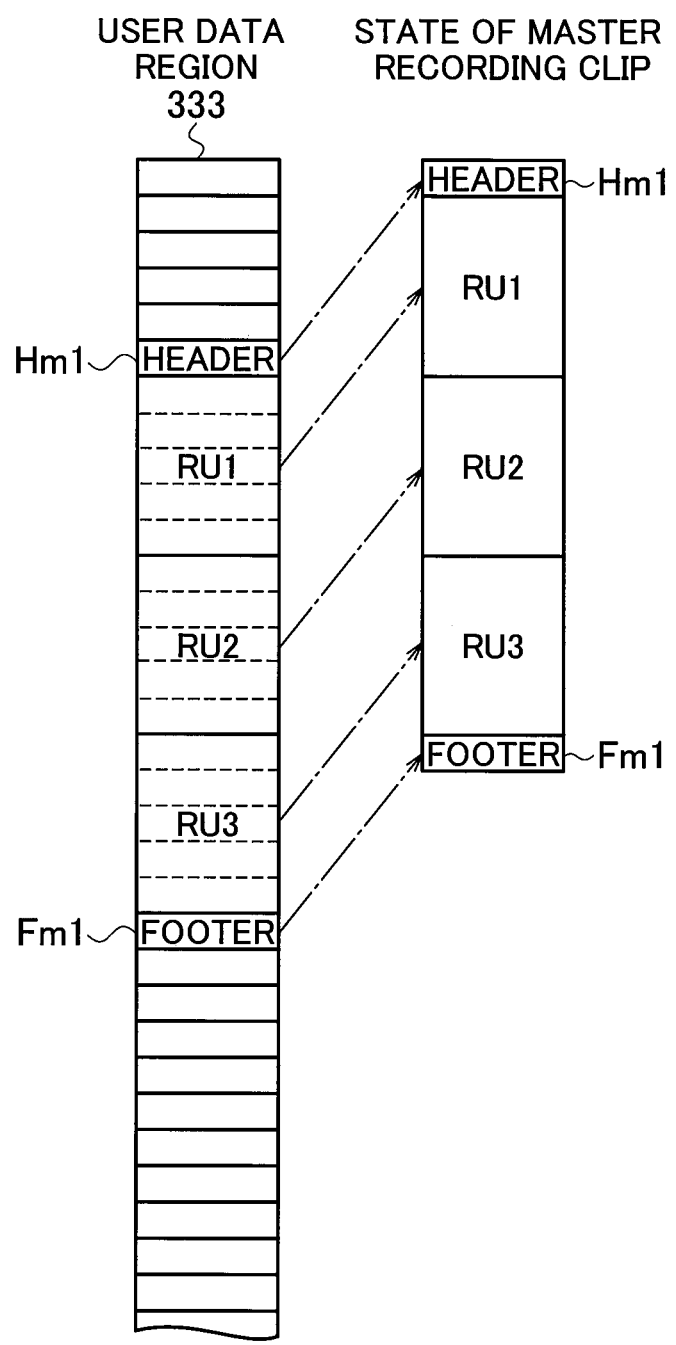
FIG. 15 is a diagram illustrating a state where the recording of multiplexed data is stopped, a footer for the master recording clip is recorded in the user data region, and management information of a master recording clip including the recording units RU1 to RU3 is recorded on the file allocation table.

When a user performs an operation of stopping recording using the operation unit 37 to end imaging and recording of multiplexed data in the recording medium 33 using the video camera, the controller 34 records a footer Fm1 for the master recording clip in a cluster continuous with the recording unit RU3 as illustrated in FIG. 15. The position of the cluster in which the footer Fm1 is recorded is arbitrary. The footer Fm1 is a second footer.

In addition, the controller 34 updates the management information of the master recording clip on the file allocation table to management information obtained by merging the recording unit RU3 with the recording units RU1 and RU2 included in advance. The recording units RU1 to RU3 are associated with the header Hm1 and the footer Fm1, so that the file of the master recording clip is closed.

As can be seen from the above description, in accordance with the data recording transmission device, the data recording transmission method, and the data recording transmission program according to one or more embodiments, FTP transmission of multiplexed data is performed for each predetermined time such as 10 seconds, and thus it is possible to improve the immediacy of network transmission. It is not necessary for a user to operate the operation unit 37 to transmit the multiplexed data through a network, such that usability is excellent.

Even when video recording time through one capturing increases, FTP transmission of multiplexed data is performed for each predetermined time, and thus time for network transmission can be reduced and a load required for a network does not increase.

In addition, as can be seen from FIG. 15, in accordance with the data recording transmission device, the data recording transmission method, and the data recording transmission program according to one or more embodiments, multiplexed data is recorded as one file including all of the recording units RU1 to RU3 which are individually transmitted through an FTP in the recording medium 33. A video through one imaging is recorded as one file in the recording medium 33 and is not recorded as separate files for the respective recording units RU1 to RU3 transmitted through an FTP, and thus convenience of file management is excellent.

An operation of the data recording transmission device according to one or more embodiments, processes executed by the data recording transmission method according to one or more embodiments, and processes that the data recording transmission program according to one or more embodiments causes the controller 34 to execute will be described with reference to a flowchart illustrated in FIG. 16.

Figure 16:
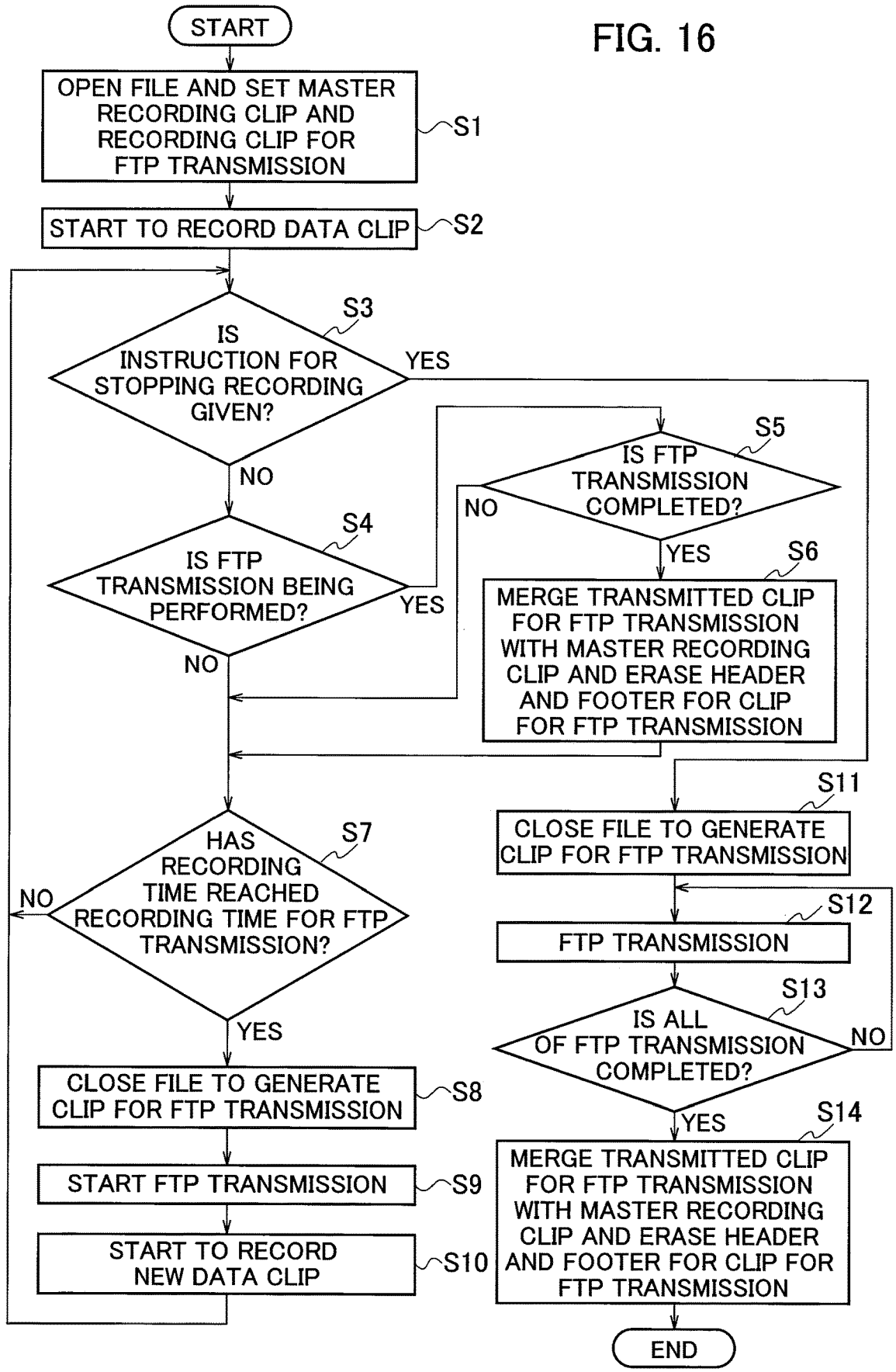
FIG. 16 is a flowchart illustrating an operation of the data recording transmission device according to one or more embodiments, processes executed by a data recording transmission method according to one or more embodiments, and processes that a data recording transmission program according to one or more embodiments causes a controller to execute.

In FIG. 16, when a video camera starts to record a video, the controller 34 opens a file to set a master recording clip and a recording clip for FTP transmission in step S1. Specifically, as illustrated in FIG. 4, the controller 34 records the header Hm1 for the master recording clip and the header Hf1 for the recording clip for FTP transmission in the user data region 333.

In step S2, the controller 34 starts to record a data clip constituted by multiplexed data. In step S3, the controller 34 determines whether an instruction for stopping recording is given by the operation unit 37. When an instruction for stopping recording is not given (NO), the controller 34 determines in step S4 whether FTP transmission is being performed. When FTP transmission is being performed (YES), the controller 34 determines in step S5 whether FTP transmission is completed.

When FTP transmission is completed in step S5 (YES), the controller 34 merges the transmitted clip for FTP transmission with the master recording clip and erases the header and the footer for the clip for FTP transmission in step S6, and causes the process to proceed to step S7. When FTP transmission is not completed in step S5 (NO), the controller 34 causes the process to proceed to step S7.

In step S6 and step S14 to be described later, the merging of the transmitted clip for FTP transmission with the master recording clip means the transition of management of unit data managed based on the management information of the clip for FTP transmission on the file allocation table to management using the management information of the master recording clip.

In step S7, the controller 34 determines whether recording time has reached the recording time for FTP transmission. When recording time has not reached the recording time for FTP transmission (NO), the controller 34 repeats the processes of steps S3 to S7.

When recording time has reached the recording time for FTP transmission in step S7 (YES), the controller 34 records the footer Ff1 and the like as described above and closes the file to generate a clip for FTP transmission in step S8. Subsequently, the controller 34 starts FTP transmission of the clip for FTP transmission in step S9 and starts to record a new data clip in step S10 to return the process to step S3.

On the other hand, when an instruction for stopping recording is given in step S3 (YES), the controller 34 closes the file to generate a clip for FTP transmission in step S11. The controller 34 performs FTP transmission of the clip for FTP transmission in step S12. In step S13, the controller 34 determines whether all of the FTP transmission is completed. When the FTP transmission is not completed (NO), the controller 34 repeats the processes of steps S12 and S13.

When all of the FTP transmission is completed in step S13 (YES), the controller 34 merges the transmitted clip for FTP transmission with the master recording clip and erases the header and the footer for the clip for FTP transmission in step S14, and ends the process.

The present invention is not limited to one or more embodiments described above, and various modifications can be made without departing from the scope of the invention.

The data recording transmission program may be transmitted to the video camera through a network and may be installed in the storage unit 35. The CPU may load the data recording transmission program into a main memory and may execute instructions written in the data recording transmission program loaded into the main memory.

What is claimed is:

1. A data recording transmission device comprising:
a recording medium interface configured to record data in a recording medium including a data region that is divided into a plurality of clusters;
a network interface configured to transmit the data recorded in the recording medium to an external device through a network; and
a controller configured to control the recording of the data in the recording medium and the transmission of the data recorded in the recording medium to the external device through the network, wherein
the controller
records a header for transmission in a cluster of the data region and a header for recording in a cluster of the data region, in response to open a file to record the data in the recording medium,
records a recording unit for the data sequentially in units of clusters of the data region, the recording unit being a predetermined time or a predetermined size,
records a footer for transmission in a cluster of the data region, after the recording medium interface completes the recording of the recording unit,
records management information of a file for transmission including unit data of the recording unit, the header for transmission, and the footer for transmission on a management table recorded in the recording medium in a state in which the unit data of the recording unit being associated with the header for transmission and the footer for transmission so as to close the file for transmission,
transmits the file for transmission to the external device through the network by the network interface,
erases the management information of the file for transmission on the management table after transmitting the file for transmission, and records management information of a file for recording including the unit data of the recording unit and the header for recording on the management table in a state in which the unit data of the recording unit being associated with the header for recording,
whenever the recording medium interface records new unit data of a recording unit in the recording medium, records a new header for transmission in a cluster of the data region, a new footer for transmission in a cluster of the data region, and management information of a new file for transmission including the new unit data of the recording unit, the new header for transmission, and the new footer for transmission on the management table in a state in which the new unit data of the recording unit being associated with the new header for transmission and the new footer for transmission so as to close the new file for transmission,
whenever the network interface transmits the new file for transmission to the external device through the network, erases the management information of the new file for transmission and updates the management information of the file for recording to management information obtained by merging the new unit data of the recording unit with the unit data of the recording unit previously included in the management information of the file for recording, and
in response to an operation to end recording of the data, records a footer for recording in a cluster of the data region, and updates the management information of the file for recording to management information obtained by merging the footer for recording with a plurality of pieces of the unit data of the recording unit and the header for recording previously included in the management information of the file for recording so as to close the data.

2. A data recording transmission method comprising:
causing a controller that controls recording of data in a recording medium including a data region that is divided into a plurality of clusters and transmission of the data recorded in the recording medium to the external device through a network to:
record a header for transmission in a cluster of the data region and a header for recording in a cluster of the data region, in response to open a file to record the data in the recording medium;
record a recording unit for the data sequentially in units of clusters of the data region, the recording unit being a predetermined time or a predetermined size;
record a footer for transmission in a cluster of the data region after the recording of the recording unit;
record management information of a file for transmission including unit data of the recording unit, the header for transmission, and the footer for transmission on a management table recorded in the recording medium in a state in which the unit data of the recording unit being associated with the header for transmission and the footer for transmission so as to close the file for transmission;
transmit the file for transmission to the external device through the network by the network interface;
erase the management information of the file for transmission on the management table after transmitting the file for transmission and record management information of a file for recording including the unit data of the recording unit and the header for recording on the management table in a state in which the unit data of the recording unit being associated with the header for recording;
whenever recording new unit data of a recording unit in the recording medium, record a new header for transmission in a cluster of the data region, a new footer for transmission in a cluster of the data region, and management information of a new file for transmission including the new unit data of the recording unit, the new header for transmission, and the new footer for transmission on the management table in a state in which the new unit data of the recording unit being associated with the new header for transmission and the new footer for transmission so as to close the new file for transmission;
whenever transmitting the new file for transmission to the external device through the network, erase the management information of the new file for transmission and update the management information of the file for recording to management information obtained by merging the new unit data of the recording unit with the unit data of the recording unit previously included in the management information of the file for recording, and
in response to an operation to end recording of the data, record a footer for recording in a cluster of the data region, and update the management information of the file for recording to management information obtained by merging the footer for recording with a plurality of pieces of the unit data of the recording unit and the header for recording previously included in the management information of the file for recording so as to close the data.

3. A computer software product that includes a non-transitory storage medium readable by a processor, the non-transitory storage medium having stored thereon a set of instructions for performing recording and transmission of data, the instructions comprising:
a first set of instructions of recording a header for transmission in a cluster of a data region and a header for recording in a cluster of the data region, in response to open a file to record the data in a recording medium that includes the data region divided into a plurality of clusters;
a second set of instructions of recording a recording unit for the data sequentially in units of clusters of the data region, the recording unit being a predetermined time or a predetermined size;
a third set of instructions of recording a footer for transmission in a cluster of the data region after the recording of the recording unit;
a fourth set of instructions of recording management information of a file for transmission including unit data of the recording unit, the header for transmission, and the footer for transmission on a management table recorded in the recording medium in a state in which the unit data of the recording unit being associated with the header for transmission and the footer for transmission so as to close the file for transmission;
a fifth set of instructions of transmitting the file for transmission to an external device through a network by a network interface;
a sixth set of instructions of erasing the management information of the file for transmission on the management table after transmitting the file for transmission and recording management information of a file for recording including the unit data of the recording unit and the header for recording on the management table in a state in which the unit data of the recording unit being associated with the header for recording;
a seventh set of instructions of, whenever recording new unit data of a recording unit in the recording medium, recording a new header for transmission in a cluster of the data region, a new footer for transmission in a cluster of the data region, and management information of a new file for transmission including the new unit data of the recording unit, the new header for transmission, and the new footer for transmission on the management table in a state in which the new unit data of the recording unit being associated with the new header for transmission and the new footer for transmission so as to close the new file for transmission;
an eighth set of instructions of, whenever transmitting the new file for transmission to the external device through the network, erasing the management information of the new file for transmission and updating the management information of the file for recording to management information obtained by merging the new unit data of the recording unit with the unit data of the recording unit previously included in the management information of the file for recording, and
a ninth set of instructions of, in response to an operation to end recording of the data, recording a footer for recording in a cluster of the data region, and updating the management information of the file for recording to management information obtained by merging the footer for recording with a plurality of pieces of the unit data of the recording unit and the header for recording previously included in the management information of the file for recording so as to close the data.

* * * * *